US009762870B2

(12) United States Patent
Yamaguchi et al.

(10) Patent No.: US 9,762,870 B2
(45) Date of Patent: Sep. 12, 2017

(54) IMAGE PROCESSING DEVICE AND IMAGE DISPLAY APPARATUS

(71) Applicant: KABUSHIKI KAISHA TOSHIBA, Tokyo (JP)

(72) Inventors: Jun Yamaguchi, Kanagawa (JP); Masahiro Baba, Kanagawa (JP); Yoshiyuki Kokojima, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/010,677

(22) Filed: Jan. 29, 2016

(65) Prior Publication Data
US 2016/0295183 A1    Oct. 6, 2016

(30) Foreign Application Priority Data

Apr. 2, 2015   (JP) ................................. 2015-076102

(51) Int. Cl.
*H04N 5/40*      (2006.01)
*H04N 9/31*      (2006.01)
(Continued)

(52) U.S. Cl.
CPC ....... *H04N 9/3182* (2013.01); *G02B 27/0172* (2013.01); *G06K 9/4661* (2013.01);
(Continued)

(58) Field of Classification Search
USPC ..... 348/724, 726, 743, 744, 823, 46, 51, 68, 348/70, 115, 136, 224.1, 236, 238, 269,
(Continued)

(56) References Cited

U.S. PATENT DOCUMENTS 5,612,708 A  *  3/1997  Ansley ................. G02B 27/017
                                          340/980
8,223,024 B1 *  7/2012  Petrou ................. G02B 27/017
                                          340/539.13
(Continued)

OTHER PUBLICATIONS

Oyamada, Y., et al., "Focal Pre-Correction of Projected Image for Deblurring on Diesplayed Image on the Screen", Graduate School of Science and Technology, Kelo University, MIRU2007/Proceedings, pp. 1295-1300 (2007).

*Primary Examiner* — Jefferey F Harold
*Assistant Examiner* — Mustafizur Rahman
(74) *Attorney, Agent, or Firm* — Finnegan, Henderson, Farabow, Garrett & Dunner, L.L.P.

(57) ABSTRACT

An image processing device includes a background luminance input unit, an image processing unit and a luminance setting unit. The background luminance input unit stores background luminance information regarding background luminance. The image processing unit generates display image data and contrast conversion information. The display image data is provided by modulating a contrast of a correction image data so that pixel values included in the correction image data are in an acceptable range. The correction image data is provided by correcting blurring in an input image data to be input to the image processing unit based on the background luminance information. The contrast conversion information is information used for modulating the contrast. The luminance setting unit generates a luminance setting information to set a luminance of the projection unit based on the modulation information.

12 Claims, 8 Drawing Sheets

(51) Int. Cl.
*G06K 9/46* (2006.01)
*G06T 5/00* (2006.01)
*G02B 27/01* (2006.01)
*G09G 3/00* (2006.01)

(52) U.S. Cl.
CPC .............. *G06T 5/00* (2013.01); *G09G 3/001* (2013.01); *G09G 3/003* (2013.01); *H04N 9/31* (2013.01); *H04N 9/3194* (2013.01); *G02B 2027/014* (2013.01); *G02B 2027/0178* (2013.01); *G09G 2320/0233* (2013.01); *G09G 2360/144* (2013.01)

(58) Field of Classification Search
USPC ....... 348/270, 273, 290, 333.1, 333.09, 342,
348/349, 353, 365, 370, 493, 586, 636,
348/650, 661, 663, 686; 345/7, 8, 41,
345/183, 419, 426, 589, 610, 617, 664;
359/13, 19, 20, 28, 210.1, 385, 390, 475,
359/507, 590, 577, 630, 800
See application file for complete search history.

(56) References Cited

U.S. PATENT DOCUMENTS

| | | | | |
|---|---|---|---|---|
| 8,228,315 | B1* | 7/2012 | Starner | G02B 27/017 345/175 |
| 9,360,672 | B2* | 6/2016 | Kobayashi | G02B 27/017 |
| 2002/0099257 | A1* | 7/2002 | Parker | A61M 21/00 600/27 |
| 2002/0154214 | A1* | 10/2002 | Scallie | G02B 27/017 348/51 |
| 2006/0007056 | A1* | 1/2006 | Ou | G02B 27/017 345/8 |
| 2008/0031490 | A1* | 2/2008 | Kobayashi | G06K 9/3258 382/101 |
| 2010/0045571 | A1* | 2/2010 | Yamamoto | G02B 27/0172 345/8 |
| 2010/0091027 | A1* | 4/2010 | Oyama | G02B 27/0068 345/581 |
| 2010/0103077 | A1* | 4/2010 | Sugiyama | G02B 27/017 345/8 |
| 2010/0177035 | A1* | 7/2010 | Schowengerdt | G06F 1/163 345/156 |
| 2010/0199232 | A1* | 8/2010 | Mistry | G06F 1/163 715/863 |
| 2010/0287485 | A1* | 11/2010 | Bertolami | G06F 3/011 715/764 |
| 2011/0057862 | A1* | 3/2011 | Chen | G02B 27/017 345/3.1 |
| 2011/0142514 | A1* | 6/2011 | Ando | G03G 15/6564 399/388 |
| 2012/0139933 | A1* | 6/2012 | Mihara | G06T 11/001 345/589 |
| 2012/0242560 | A1* | 9/2012 | Nakada | G09G 3/3406 345/8 |
| 2013/0182185 | A1* | 7/2013 | Koyama | H04N 1/6027 348/672 |
| 2013/0222213 | A1* | 8/2013 | Abdollahi | G02B 27/0176 345/8 |
| 2014/0184477 | A1* | 7/2014 | Hino | G06F 3/005 345/8 |
| 2014/0268336 | A1* | 9/2014 | Hiraide | G02B 27/0172 359/507 |
| 2015/0009416 | A1* | 1/2015 | Tamayama | H04N 5/64 348/746 |
| 2015/0050880 | A1* | 2/2015 | Choi | H04W 76/02 455/39 |
| 2015/0312468 | A1* | 10/2015 | Taylor | H04N 13/0239 348/47 |
| 2015/0326258 | A1* | 11/2015 | Song | H04B 1/0475 455/127.2 |
| 2015/0338662 | A1 | 11/2015 | Tsuruyama et al. | |
| 2016/0028940 | A1* | 1/2016 | Izawa | G03B 17/20 348/349 |

* cited by examiner

IMAGE PROCESSING DEVICE AND IMAGE DISPLAY APPARATUS

CROSS-REFERENCE TO RELATED APPLICATIONS

This application is based upon and claims the benefit of priority from Japanese Patent Application No. 2015-076102, filed Apr. 2, 2015, the entire contents of which are incorporated herein by reference.

FIELD

Embodiments described herein relate generally to an image processing device and image display apparatus.

BACKGROUND

Image display apparatus for displaying images to the eyes of a user have been proposed. For example, the image display apparatus may be a head-mounted display. The image display apparatus may comprise a display unit, a projection unit, and a reflection unit. Light from a light source incident to the display unit and light including image information based on display image data is emitted by the display unit. The direction of at least a part of the light rays of the light including image information is corrected by an optical component, and the projection unit emits the corrected light. The reflection unit reflects at least a part of the light rays of the corrected light toward an eye of a user.

An image (an observation image) observed by a user may include blurring, color shift, and/or distortion due to an aberration caused by optical components or lens systems in the reflection unit, such as lenses or half mirrors. Image processing techniques to suppress this deterioration in image quality have been proposed. An inverse of the deterioration characteristics due to the aberration is applied to the image data to be input to the image display apparatus prior to display. In particular, an inverse filter having inverse characteristics relative to a space filter or frequency filter that expresses the blurring aberration in the observation image may be applied to the display image data. The user is thus able to observe an image in which the blurring is suppressed by the inverse filter.

DETAILED DESCRIPTION

Each of the embodiments will now be described in detail with reference to the accompanying drawings.

Note that the figures are conceptual pattern diagrams, and the relationships between thicknesses and widths and ratios of size of each part are not necessarily represented to scale. Moreover, the size and ratio of components that appear in multiple figures are not necessarily the same in each figure.

According to one embodiment, an image processing device includes a background luminance input unit, an image processing unit and a luminance setting unit. The background luminance input unit stores background luminance information regarding background luminance. The image processing unit generates display image data and contrast conversion information. The display image data is provided by modulating a contrast of a correction image data set so that pixel values included in the correction image data set are in an acceptable range. The correction image data set is provided by correcting blurring in an input image data set to be input to the image processing unit based on the background luminance information. The contrast conversion information is information used for modulating the contrast. The luminance setting unit generates luminance setting information to set a luminance of the projection unit based on the modulation information.

(First Embodiment)

Figure 1:
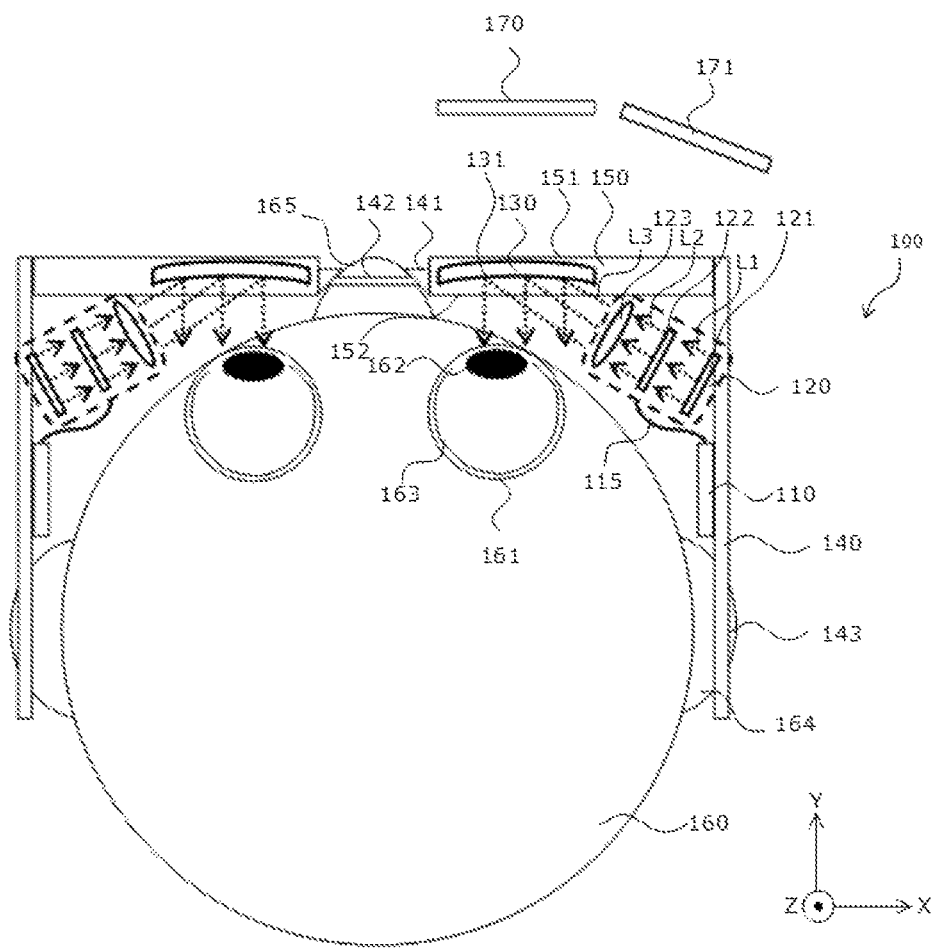
FIG. 1 is a diagram of an image display apparatus according to a first embodiment.

FIG. 1 is a diagram of an image display apparatus according to a first embodiment. As illustrated in FIG. 1, an image display apparatus 100 comprises a circuit (image processing device) 110, a projection unit 120, and a reflection unit 130.

The circuit 110 is connected to an external memory medium or network, and receives input image data. The connection may be wired or wireless. The circuit 110 may be connected to the projection unit electrically through a cable 115 and may transmit the image display data to a display 122 in the projection unit 120.

The projection unit 120 emits light including image information based on display setting information.

The projection unit 120 may comprise a light source 121, the display 122, and a lens system 123. The light source 121 may be white LED (Light Emitting Diode) and may comprise a red LED, a green LED, and a blue LED.

The display 122 may comprise a plurality of pixels arranged in a plane to display an image based on the display image data. The display 122 transmits light L1 emitted from the light source 121. Light including image information L2 based on the display image data is emitted by the display 122 toward the lens system 123. The light source 121 may not necessarily be needed in the case where the display 122 is a self-lighting type display. The display 122 may, for example, comprise a liquid crystal display, an organic EL (Electro Luminescence) display or LCOS (Liquid Crystal On Silicon) display.

The lens system 123 is located between the display and the reflection unit 130 in a light path of the light including image information L2. The lens system 123 corrects a direction of at least a part of the light including image information to travel toward the reflection unit 130. The light that travels from the lens system 123 toward the reflection unit 130 is defined as correction light L3.

The lens system 123 includes at least one optical component. The optical component may be, for example, a lens, a prism, or a mirror. In the case where the lens system 123 includes a plurality of optical components, the optical components are not necessarily directly-aligned.

The reflection unit 130 reflects at least a part of light emitted by the projection unit toward the eye 161 of a viewer. That is, the reflection unit 130 reflects at least a part of light rays included in the correction light L3 towards the eye 161, so the reflection unit 130 reflects at least a part of the light including image information toward the eye. The reflection unit 130 transmits a part of incident light so that a user observes background on which an image overlaps. At least a part of the light rays included in the correction light L3 reflected by the reflection unit 130 is incident on the pupil 162 and is collected on the retina 163 by the lens and cornea. A virtual image is formed on an extended line of light rays included in the correction light L3 extended in a direction opposite to the traveling direction. In this way, it is possible to view the observation image 170 for a user 160.

In this embodiment, the relative position between the display 122 and a lens system 123 is fixed in the projection unit 120. The relative position between the display 122 and an lens system 123 may not be fixed in the projection unit 120. For example, the distance and relative attitude between the display 122 and the lens system 123 may be adjusted by adjusting screws that fix the position of the display 122 and/or the lens system 123 on the projection unit. For example, the distance between the pupils 162 and the observation image 170 and the size of the observation image 170 may be adjusted by adjusting the distance between the display 122 and the lens system 123.

The reflection unit 130 transmits a part of a light that is incident on the reflection unit 130. In this manner, a user is able to see the view through the reflection unit 130.

The reflection unit 130 is provided along a first plane 131. For example, the reflection unit 130 may comprise a plurality of fine reflection planes arranged along the first plane 131. The first plane 131 may be flat or curved. Each of the plurality of reflection planes may be implemented using a half mirror that reflects at least a part of the light that is incident on the reflection plane. However, the reflection unit 130 need not be implemented using a half mirror. Any member that transmits a part of the incident light and reflects or otherwise modifies a reflection angle of another part of the incident light may be used as the reflection unit 130.

Each of the plurality of reflection planes is declined with respect to the first plane 131 and there are gaps between the reflection planes along a direction perpendicular to the first plane 131. The angle between the reflection plane and the first plane 131 is set based on the light axis of the projection unit 120 and the positional relationship between the eyes 161 and the observation image 170. Reflection angle is changed by the angle between the reflection plane and the first plane 131. The reflection unit 130 may be implemented by a plurality of reflection planes, e.g., forming a Fresnel mirror.

The observation image 170 is displayed in front of a user 160 in this embodiment. The observation image 171 may alternatively be displayed at an edge of the range of the user's vision, so as not to block the user's view.

The image display apparatus 100 may be implemented in a heads-up display. The image display apparatus 100 may be, for example, a spectacle type image display apparatus. The image display apparatus 100 may include a spectacle frame or holding part 140. FIG. 1 shows image display apparatus 100 mounted on the head of a user 160 with the holding part 140.

The image display apparatus 100 may further include spectacle lenses 150. The reflection units 130 may be included in the spectacle lenses 150. The holding part 140 may include a nose pad 141, bridge 142, and temple 143. The bridge 142 portion may connect spectacle lenses 150. The holding part 140 may further include a rim to hold the spectacle lenses 150. A non-refractive glass may be used as the spectacle lenses 150. Each of the spectacle lenses 150 has a first surface 151 and a second surface 152 being apart from the first surface 151. The reflection units 130 may be provided between the first surface 151 and the second surface 152. The reflection units 130 may additionally or alternatively be provided on the first surface 151 or the second surface 151. The relative positions between the nose pad 141 and the spectacle lens 150 may be fixed. That is, the relative positions between the reflection unit 130 and the spectacle lens 150 may be fixed.

The spectacle lenses 150 may be held by the holding part 140. The angle between the holding part 140 and the spectacle lens 150 may be adjustable. The projection unit 120 may be held by the holding part 140. The position and attitude of the projection unit 120 may be adjustable.

In use, the nose pad 141 may be placed on the user's nose 165 and the temple 143 on the user's ear 164. Relative positions of the holding part 140, the spectacle lens 150, and the reflection unit 130 may be decided based on the position of the nose 165 and the ear 164 of the user 160. Relative positions of the holding portion 140 and the reflection unit 130 may be substantially fixed.

Blurring caused by the image display apparatus 100 will be described.

An observation image 170 may include blurring, color shift, and distortion because of an aberration caused by the lens system 123 and a component in the reflection unit, such as a lens or a half mirror.

The light including image information from the display 122 forms a group of light rays from each pixel in the display 122. A light ray from a pixel spreads as the ray travels. For example, the light ray spreads out in cone shape. A part of a light ray passes the lens system 123 and is reflected by the reflection unit 130 to be incident on the eye of a user and is collected on one point on the retina 163. In this case, it is able to observe the observation image 170 without blurring.

However, a part of a light ray may diverge from an ideal path because of an aberration. In this case, light rays from a plurality of pixels may overlap each other on the retina 163, so that the user observes the observation image with blurring.

To suppress such blurring, an image processing technique in which an inverse filter that has an inverse characteristic relative to a space filter or frequency filter that expresses the deterioration process that causes blurring in the observation image may be applied to the display image data. However, such processing with the inverse filter may result in a pixel value that is out of the acceptable range for the image. In particular, an edge where a pixel value is near the border of the acceptable range is likely to include blurring. The acceptable range may be set for each image or each image data. Circuit 110 may set the acceptable range for the input image data, the deblurring image data, and the display image data. The acceptable range may be stored in an image processing unit described later. The acceptable range may be determined prior to processing by the image processing unit.

A so-called Wiener filter may be applied to input image data of a projector preliminarily to correct blurring of a focus on a screen. In the case where the pixel value after application of the Wiener filter is out of the acceptable range, (a) a clipping process may be executed for the pixel value being out of the acceptable range or (b) contrast of the image may be modulated so that the pixel values are in the acceptable range. In the case of (a), the effect of deblurring may be suppressed, thus causing distortion of the image. In the case of (b), the blurring may be corrected, however visibility of the observation image may be low, due to a decrease in a contrast of the observation image and a contrast and luminance of the background. Contrast and luminance of the background refers to a maximum luminance of the observation image 160 relative to the luminance of background. The higher the contrast and luminance of the background, the higher the visibility of the observation image 170.

For this reason, it is desirable to display the observation image without the blurring and other problems described above.

Figure 2:
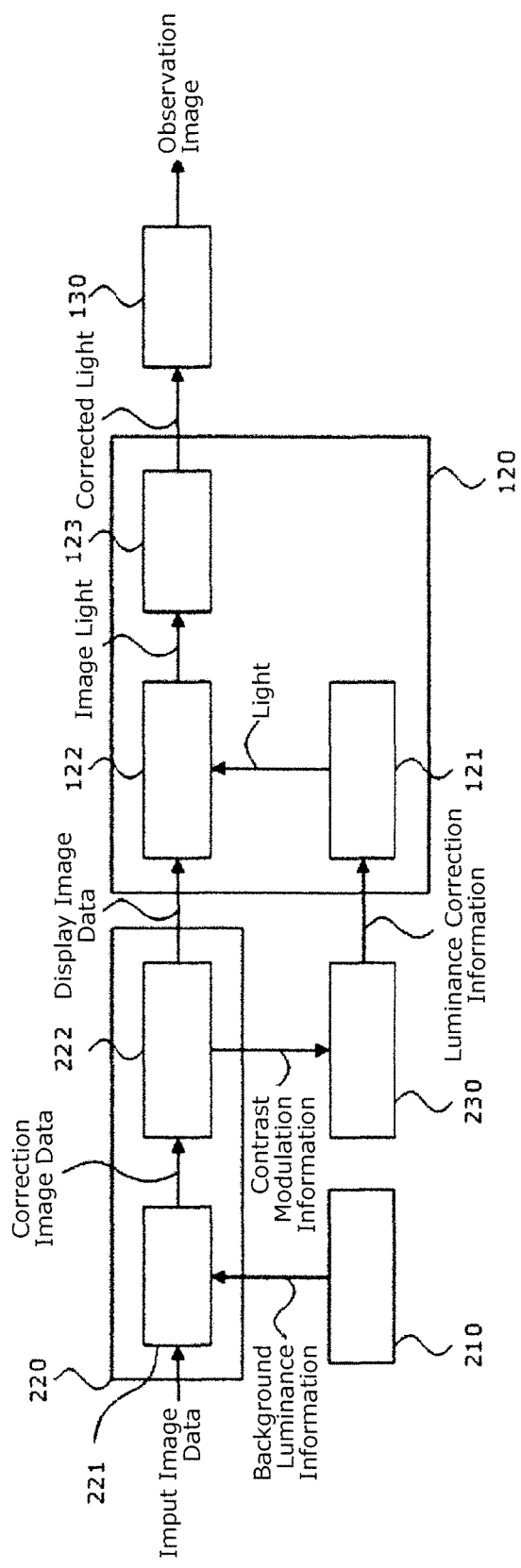
FIG. 2 is a block diagram of the image display apparatus according to the first embodiment.
Figure 3:
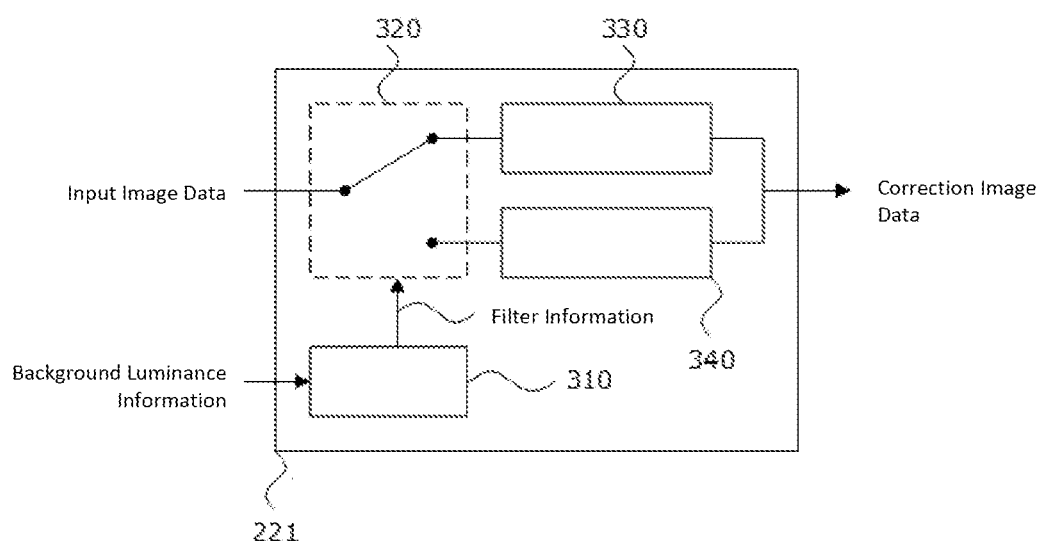
FIG. 3 is a block diagram of a deblurring unit according to the first embodiment.

FIG. 2 is a block diagram of the image display apparatus according to the first embodiment. FIG. 3 is a block diagram of a deblurring unit according to the first embodiment.

As shown in FIG. 2, the circuit (image processing device) 110 comprises a background luminance input unit 210, an image processing unit 220, and a luminance correction unit (luminance setting unit) 230. For example, the background luminance input unit 210, the image processing unit 220, and the luminance correction unit (luminance setting unit) 230 may be included in the circuit 110.

The background luminance input unit 210 stores information (background information) regarding a luminance of a background on which the observation image 170 is overlapped and transmits the background information to the image processing unit 220. The background luminance input unit 210, for example, may acquire the background information.

The image processing unit 220 comprises a deblurring unit 221 and a contrast conversion unit 222. The deblurring unit 221 corrects the blurring in the input image data that is input to the circuit 110 and transmits the correction image data to the contrast conversion unit 222. The input image data and the correction image data include pixel values. The contrast conversion unit 222 modulates a contrast of the pixel values in the correction image data so that the pixel values are in the acceptable range and transmits the modulated correction image data as a display image data to the display 122 of the projection unit 120. The contrast conversion unit 222 also transmits information used as contrast conversion information to the luminance correction unit 230.

The luminance correction unit 230 transmits the luminance setting information to set the luminance of the projection unit 120 based on the contrast conversion information. In particular, the luminance correction unit 230 calculates luminance of the observation image 170, as decreased by the modulating of the contrast of the pixel values in the correction image data, and transmits the result to the light source 121 of the projection unit 120 as the luminance correction information.

The display 122 emits the light including image information to the lens system 123 by displaying the display image based on the display image data transmitted by the image processing unit 220, and transmitting light from the light source 121 based on the luminance correction information. The lens system 123 changes a traveling direction of at least a part of the light including image information toward the reflection unit 130.

As described in FIG. 3, the deblurring unit 221 comprises filter image filtering units 330, 340. The deblurring unit 221 may further comprise a filter selection unit 310 and a filter switching unit 320. Each of the filter image filtering units 330, 340 applies a different filter to the input image data and transmits the correction image data. That is, deblurring unit 221 comprises a filter set consisting of two filters. The filter selection unit 310 transmits filter information to select a filter image processing unit based on the background luminance information to the filter switching unit 320. The filter switching unit 320 switches filters (the filter image processing units) based on the filter information.

In this embodiment, a case in which a filter is selected from a filter set consist of two filters (filter image processing units) is described. A filter may be selected from a filter set consisting of three or more filters.

The block diagrams in FIGS. 2 and 3 are examples only, and it is to be understood that the disclosed apparatus may be implemented in other ways. For example, a part of each block may be implemented apart from the image display apparatus.

Figure 4:
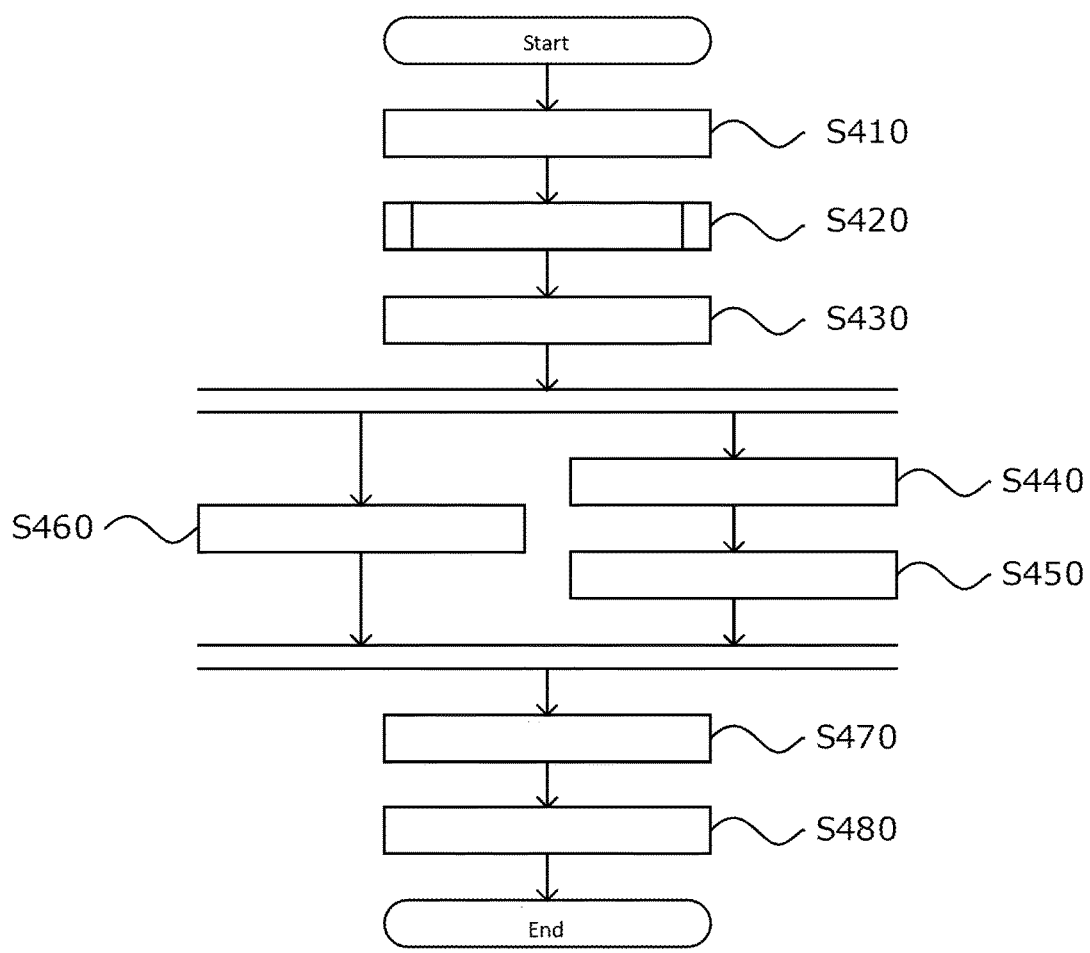
FIG. 4 is a flow chart corresponding to the FIG. 2.
Figure 5:
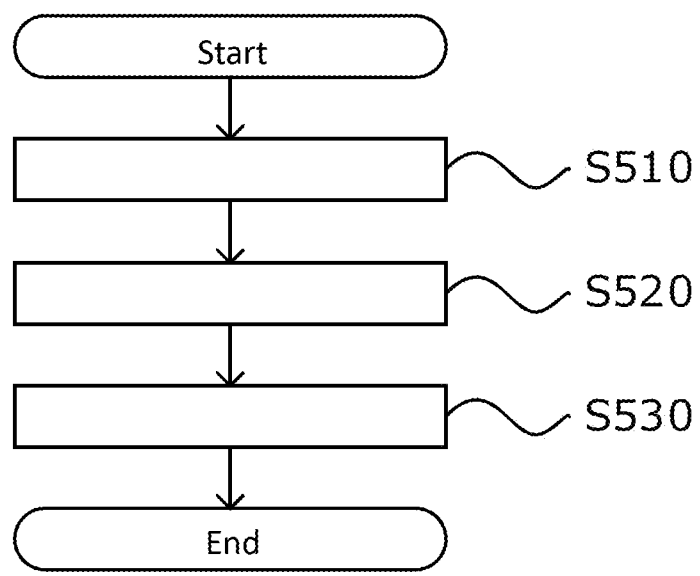
FIG. 5 is a flow chart corresponding to the FIG. 3.

FIG. 4 is a flow chart corresponding to the image display apparatus 100 in FIG. 2. FIG. 5 is a flow chart corresponding to the FIG. 3. Processing in each of the blocks of the image display apparatus 100 is described with reference to FIGS. 2 through 5.

In step S410, background luminance on which the observation image 170 is overlapped (background luminance in front of the user 160) is input to the background luminance input unit 210 and the background luminance information is transmitted to the image processing unit 220. The background luminance may, for example, be measured by a sensor such as a camera.

In the case where the environment of use changes momentarily, the background luminance may be measured every time the background luminance changes and the measurement result may be input to the background luminance input unit 210. In the case where the change of the background luminance is small because of the limitation of the environment of use, the background luminance may be preliminarily measured and input to the background luminance input unit 210. In the case where the environment of use is limited to a few patterns, the background luminance of each pattern may be preliminarily measured and input to the background luminance input unit 210.

The background luminance may be input manually or automatically. For example, a user 160 may input the background luminance to the background luminance input unit 210, which may be implemented with software or hardware.

In step S420, blurring in the input image data is corrected based on the background luminance by the deblurring unit 221 and correction image data is transmitted to the contrast conversion unit 222. As described above, an image observed by a user may include blurring, color shift, and distortion because of an aberration caused by the lens system 123 and reflection unit 130. To correct a blurring in the observation image, for example, the inverse filter that has inverse characteristic relative to space filter or frequency filter that express the deterioration process that causes blurring in the observation image may be applied to the input image data. An energy function to express a difference between a desirable image to be observed by a user, which does not include blurring and the observation image 170 is made smaller by the inverse filter. Therefore, it is able to display a blurring-corrected observation image to a user.

As described above, a pixel value of the correction image data may be out of the acceptable range. The more the inverse filter is effective to correct blurring, the more easily a pixel value of the correction image data may be out of the acceptable range because of the occurrence of an overshoot or an undershoot. In this case, if a contrast of the correction image data is modulated so that a pixel value is in the acceptable range, there is a problem that a contrast of the observation image is decreased. The higher the background luminescence is, the harder it is for a contrast of the observation image to be affected by the contrast conversion of the correction image data. For example, in the case where the background luminescence is high and a contrast of the correction image data is modulated to decrease the background luminance, the decrease in a contrast of the observation image may be suppressed. For example, in the case where the background luminescence is high, an inverse filter that has strong effect for correcting blurring may be applied.

An example of a way to calculate the inverse filter will be described. The deterioration process that causes blurring in the observation image 170 may be expressed as a space filter. For example, a spot diagram may be obtained by tracing a part of the light rays that are emitted from a pixel in the display 122 and incident on pupils 162, by plotting points at the intersection of lines extended along the light rays from the reflection unit 130 to the pupils 162 in a reverse direction to the traveling direction with the observation image 170. The spot diagram is a space filter expressed based on the deterioration process. A space filter may be obtained by imaging the observation image 170 with a camera and estimating the deterioration process.

The deterioration process may be expressed as below.

$$y = Bx \quad (1)$$

where y is a vector that expresses the observation image 170; x is a vector that expresses a desirable image to be observed by a user that does not include blurring; and B is a matrix of a space filter that express the deterioration processes.

The inverse filter may, for example, be acquired by finding a correction image data to decrease the energy function J.

$$J = \|x - B\hat{x}\|^2 + \epsilon \|C\hat{x}\|^2 \quad (2)$$

where $\hat{x}$ is a vector that expresses the correction image data; C is a matrix that expresses regularization operator; and $\epsilon$ is a regularization weight coefficient.

Matrix C may, for example, be a Laplacian operator or operators. The first element in the relation (2) expresses energy of a difference between a desirable image to be observed by a user that does not include blurring and the observation image 170. Because it is difficult for the correction image data to minimize the first item in an undetermined system, the second element in relation (2) is a regularization item for finding the correction image data stably. In this second element, the smaller the regularization weight coefficient $\epsilon$, the stronger the correction of the blurring in the observation image 170, but also the bigger the overshoot or undershoot around the edge of the correction image data. The overshoot or undershoot may cause a pixel value in the correction image data to fall out of the acceptable range. The regularization weight coefficient $\epsilon$ may be, for example, selected based on an edge intensity of the image. The weaker the edge intensity is, the smaller the regularization weight coefficient $\epsilon$ may be.

The inverse filter is, for example, smaller than an energy function that expresses a difference between an image data that is generated by convolution of the correction image data with the space filter that expresses the deterioration process that causes blurring in the observation image and determined image data.

The inverse filter may be calculated by finding the correction image data to minimize the energy function J of the relation (2).

$$I = B^T B + \epsilon C^T C)^{-1} B^T \quad (3)$$

where I is a matrix that expresses the inverse filter.

In the case where the deterioration process attenuates high frequency components of the image to be observed by an user, the inverse filter may be, for example, a high-pass filter or a sharpening filter. A high-pass filter or a sharpening filter may be implemented, for example, using an unshaped mask.

The deblurring in step S420 will be described with reference to FIGS. 3 and 5.

In step S510, the filter selection unit 310 transmits filter information to the filter switching unit 320, so as to select a filter from a filter set consisting of two filters based on the background luminance information. The filter set may, for example, comprise an inverse filter A that has strong deblurring effect (that is, having a small value of $\epsilon$ in relation (2)) and an inverse filter B that has weak deblurring effect (having a large value of $\epsilon$). For example, in the case where a background luminescence is high, the inverse filter A (which has strong deblurring effect) is selected and in the case where a background luminescence is low, the inverse filter B (which has weak deblurring effect) is selected. The filter set may, for example, comprise high-pass filters that have different pass levels or sharpening filters that have different sharpening levels.

In step S520, the filter switching unit 320 switches filters to be applied to the input image data based on the filter information.

In step S530, the filter selected by the filter switching unit 320 is applied to the input image data. The way that the inverse filter is applied to the input image data may depend on the type of the inverse filter, e.g., whether the inverse filter is a space filter or a frequency filter. For example, in the case where the filter set includes space filters, the selected filter may be applied directly to the pixel in the input image data. In the case where the filter set includes frequency filters, the selected filter may be, for example, applied to the transformed input image data, which is transformed in a given frequency range with a Fourier transform. For example, in the case where the inverse filter is a space filter, the correction image data may be generated by multiplying at least one of pixel values in the input image data and a weighting coefficient that expresses the inverse filter. For example, in the case where the inverse filter is a frequency filter, the correction image data may be generated by multiplying transformed image data obtained by Fourier transform of the input image data by the inverse filter, and by transforming the result of the multiplication with an inverse Fourier transform.

The inverse filter may be applied to a value in a color space that is linear with respect to the luminescence of the observation image 170. For example, a color space may be a CIE-RGB color system or a CIE-XYZ color system. In the case where there is no linear relationship between a pixel value of the input image data and a luminescence of the observation image 170, the inverse filter may be applied to a value obtained by transforming a pixel value of the input image data in a color space that is linear to the luminescence of the observation image 170. Then the value may be transformed in the original color space. The inverse filter may be applied to a value in a color space that is not linear to the luminescence of the observation image 170 as long as the effect of the deblurring does not decrease undesirably.

In step 430, the contrast conversion unit 222 transmits the display image data, which is obtained by modulating the contrast of the correction image data so that a pixel value of the correction image data is in the acceptable range to the projection unit 120. The contrast conversion unit 222 also transmits the contrast conversion information to the luminance correction unit 230.

The image processing unit 220 modulates a contrast based on the maximum value and the minimum value of the correction image data. For example, if the minimum value of the correction image data is out of the acceptable range, contrast conversion to the correction image data may be performed according to relation (4).

$$g(x, y) = \frac{\text{MAX}}{f_{max} - f_{min}}(f(x, y) - f_{min}) \qquad (4)$$

The function f(x, y) is a pixel value of the coordinate (x, y) in the correction image data. The function g(x, y) is a pixel value of the coordinate (x, y) in the display image data. The value $f_{max}$ is the maximum value of the f(x, y). The value $f_{min}$, is the minimum value of the f(x, y). The value MAX is the maximum value in the acceptable range. For example, an image has N-bit pixels, MAX is $2^N-1$ because the acceptable range is from 0 to $2^N-1$.

For example, in the case where the maximum pixel value of the correction image data is out of the acceptable range and the minimum pixel value of the correction image data is within the acceptable range, contrast conversion to the correction image data may be performed according to relation (5).

$$g(x, y) = \frac{\text{MAX} - f_{min}}{f_{max} - f_{min}}(f(x, y) - f_{min}) + f_{min} \qquad (5)$$

For example, in the case where the maximum pixel value of the correction image data is in the acceptable range and the minimum pixel value of the correction image data is out of the acceptable range, contrast conversion to the correction image data may be performed according to relation (6).

$$g(x, y) = \frac{f_{max}}{f_{max} - f_{min}}(f(x, y) - f_{min}) \qquad (6)$$

Contrast conversion may be performed in other ways than the ways described above as long as pixel values in the modulated correction image data are within the acceptable range. For example, contrast conversion may be performed based on the LUT (Look Up Table), which associates pixel values between pixel values before the modulation and pixel values after the modulation.

The pixel values of the correction image data may lie outside of the acceptable range as long as visibility of the observation image does not decrease. The pixel values of the observation image that lie outside of the acceptable range may be clipped. For example, in the case where the minimum pixel value of the correction data is −100 and the maximum pixel value of the correction data is 500, contrast of the correction image may be modulated so that the minimum value is −5 and the maximum value is 260. The pixel values that lie outside of the acceptable range may be clipped. If a number of the pixels whose pixel values are clipped is small or a change of the pixel values by the clipping are small, the magnitude of the deblurring and the magnitude of the distortion by clipping are likewise small.

In the case where the pixel values of the correction data are in the acceptable range, contrast conversion may be performed with relation (4). In this case, visibility of the observation image will be improved because of improvement of contrast of the observation image.

The contrast conversion information is information to indicate what kind of contrast conversion is performed. For example, in the case where the contrast conversion is performed with relations (4) and (5), the contrast conversion information may include the maximum pixel value of the correction image data. For example, the contrast conversion information may include information to indicate the amount of change of the maximum pixel value or the amount of change of the minimum pixel value of the correction image data.

In step S440, the luminance correction unit 230 finds an amount of luminance correction to correct luminance of the light source in the projection unit 120 so that the decrease of luminance of the observation image by the contrast modulating will be canceled. The luminance correction unit 230 transmits the result as the luminance correction information to the projection unit 120. For example, in the case where the contrast modulating is performed, e.g., according to relations (4) and (5), an amount of luminance correction may be found with relation (7).

$$\Delta L = \left(\frac{f_{max}}{\text{MAX}} - 1\right)L \qquad (7)$$

where L is a reference luminance value of the light source and $\Delta L$ is an amount of luminance correction.

A relationship between a pixel value of the correction data and luminance of light including image information from the display 122 may be non-linear. For example, a relation between a pixel value of the correction data and luminance of light including image information from the display 122 may have gamma characteristic as below.

$$l = L\left(\frac{f}{\text{MAX}}\right)^\gamma \qquad (8)$$

where l is a value of luminance of light including image information; f is a pixel value in the correction image; and γ is a parameter to express gamma characteristic. In this case, an amount of luminance correction may be calculated with the relation (9).

$$\Delta L = \left(\left(\frac{f_{max}}{\text{MAX}}\right)^\gamma - 1\right)L \qquad (9)$$

In step S450, the light source emits light that is corrected based on the luminance correction information toward the display 122. For example, in the case where the luminance correction information has an amount of luminance correction expressed with relation (7) or (9), luminance of light from the light source 121 may be corrected according to relation (10).

$$L_c = \Delta L + L \qquad (10)$$

where $L_c$ is a luminance value of corrected light emitted from the light source 121. The luminance of observation image 170 does not decrease. Therefore, luminance and contrast of the background does not decrease and contrast of the observation image 170 after the correction increases with respect to the contrast of the observation image 170 before the correction. Therefore visibility of the observation image 170 is improved.

In step S460, light including image information is emitted toward the lens system 123, when display image data input by the image processing unit 220 is displayed on the display 122. Light from the light source 121, whose luminance is corrected based on the luminance correction information, is transmitted to the display 122.

In step S480, the reflection unit 130 reflects at least a part of light rays of the correction light toward the user's eyes 161. The correction light L3 is reflected by the reflection unit 130 so as to be incident on pupils 162 and is collected on the retina 163 by the lens and cornea so that a virtual image is formed in front of the user 160. The reflection unit 130 also transmits a part of the light incident on the reflection unit 130. Therefore the user 160 is able to observe the observation image 170 and outside world in front of the user.

By this embodiment, the user 160 is provided with an observation image 170 in which the blurring due to aberration caused by such as the lens system 123 and the reflection unit 130 has been corrected. Furthermore, in the case where a pixel value after an inverse filter is applied is out of the acceptable range, the corrected observation image is provided without decreasing a luminance and contrast of the background. The decrease of the contrast of the observation image is further suppressed.

(Second Embodiment)

Principles of the distortion and color shift that may occur in the image display apparatus 100 will be described.

As described above, because of an aberration caused by transmission and reflection of light rays by the optical component and a lens system in the reflection unit, deterioration such as blurring, color shift, and distortion may occur. In this case, a user 160 observes the observation image that includes more blurring, color shift, and distortion than may be estimated to occur in the observation image.

The color shift and distortion in the observation image may be corrected by distorting the image inversely with respect to the color shift and distortion caused by the aberration.

Figure 6:
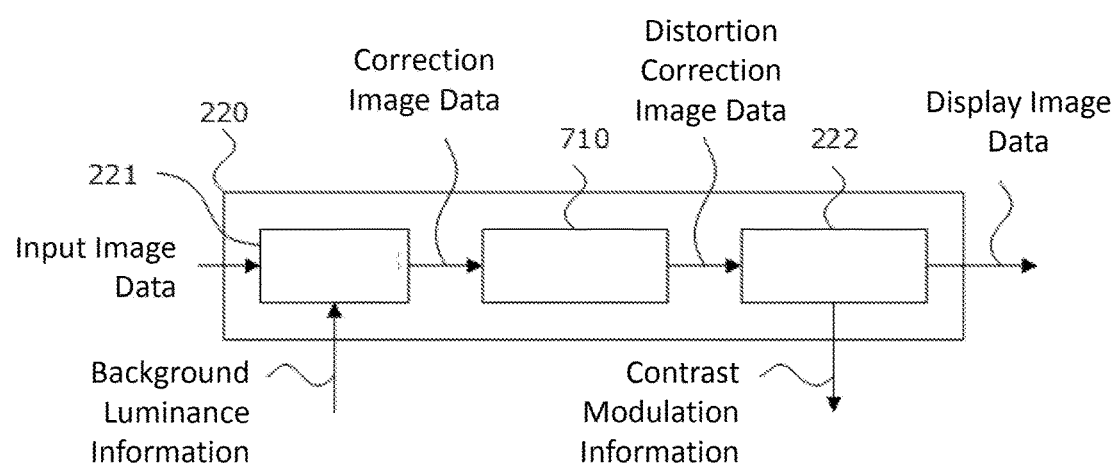
FIG. 6 is a block diagram of the image display apparatus according to a second embodiment.

FIG. 6 is a block diagram of an example of the image display apparatus according to the second embodiment.

As illustrated in FIG. 6, the image processing unit 220 of the image display apparatus 100 further comprises a distortion correction unit 710.

That is, the image processing unit 220 comprises the deblurring unit 221, the distortion correction unit 710, and the contrast conversion unit 222. The deblurring unit 221 corrects blurring in the image data input to the image display apparatus 100 and transmits the correction image data to the distortion correction unit 710. The distortion correction unit 710 corrects distortion in the correction image data and transmits distortion correction image data to the contrast conversion unit 222. The contrast conversion unit 222 transmits display image data to the projection unit 120 and transmits contrast conversion information to luminance correction unit 230.

Figure 7:
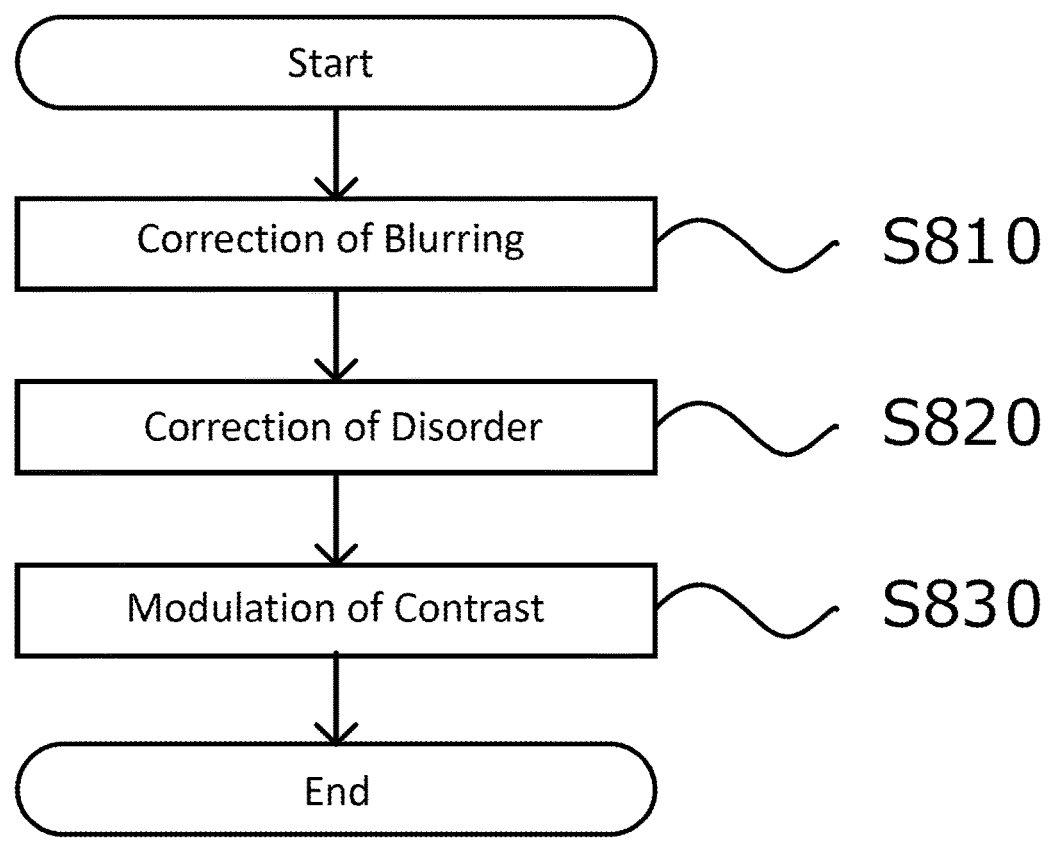
FIG. 7 is a flow chart corresponding to the FIG. 6.

The block diagram illustrated in FIG. 7 is exemplary and is not required for implementation. For example, a part of each block may be separated from the image display apparatus. The burring correction unit 221 and the distortion correction unit 710 may be substituted for each other. In this case, the distortion correction unit may correct distortion in the input image data and transmit distortion correction image data to the deblurring unit 221. The deblurring unit 221 may correct blurring in the distortion correction image data and may transmit deblurring image data to the contrast conversion unit 222. The contrast conversion unit 222 may transmit display image data in which the contrast of the deblurring image data is modulated to the projection unit 120.

The deblurring unit 221 and the distortion correction unit 710 may be substituted by a unit that is able to correct both blurring and distortion. In this case, the unit may correct blurring and distortion in the input image data and transmit correction image data to the contrast conversion unit 222. The contrast conversion unit 222 may transmit display image data in which the contrast of the correction image data is modulated to the projection unit 210.

FIG. 7 is a flow chart to illustrate the image display apparatus 100 according to the second embodiment. Process in the image processing unit 220 will be described with FIGS. 6 and 7.

In step 810, the deblurring unit 221 corrects blurring in the input image data input to the image display apparatus 100, based on the background luminance, and transmits the correction image data to the distortion correction unit 710. The blurring may be corrected in the same manner as described above with respect to the first embodiment.

In step S820, the distortion correcting unit 710 corrects distortion of the correction image data and transmits the distortion-corrected image data to the contrast conversion unit 222. For example, color shift and distortion due to aberration are expressed by an LUT indicating a relation between arbitrary pixels in the display 122 and the positions in the observation image corresponding to the pixels. The deblurring image data is distorted inversely to a color shift and distortion based on the LUT. Therefore, a user is able to observe the observation image that does not include color shift and distortion.

In step S830, the contrast conversion unit 222 transmits the display image data in which contrast is modulated so that pixel values of the distortion correction image are modulated to be in the acceptable range for the projection unit 120. The contrast conversion unit 222 also transmits the contrast conversion information to the luminance correction unit 130. The contrast of the correction image data may be modulated, for example, in the same manner as described above with respect to the first embodiment.

By this embodiment, the user 160p is provided with an observation image 170 in which blurring due to aberration caused by color shift and distortion of the lens system 123 and the reflection unit 130 have been corrected. Furthermore, in the case in which a pixel value after an inverse filter is applied is out of the acceptable range, the corrected observation image is provided without decreasing a luminance and contrast of the background. The decrease of the contrast of the observation image is also suppressed.

Figure 8:
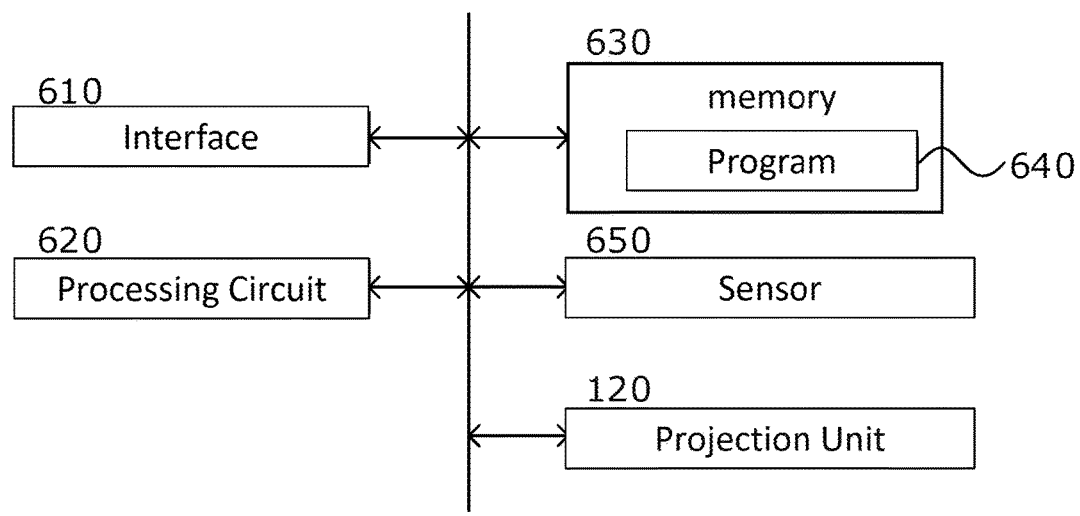
FIG. 8 is a diagram of a structure of an image display apparatus.

FIG. 8 is a diagram of an example of a structure of the image display apparatus. As described in FIG. 8, the circuit 110 includes, for example, an interface 610, a processing circuit 620, and a memory 630.

The circuit 110 may, for example, be connected to such as a recording medium that is outside of the image display apparatus, network, or an image reproducer, and acquire the input image data through an interface. The circuit 110 may be connected to a recording medium, network, or an image reproducer by wire or by a wireless network.

The processing circuit 620 may, for example, process the input image data information acquired through a sensor 650, and image information based on the program 640. For example, processes of the image processing unit 220 and luminance correction unit 230 may be performed in the processing circuit 620 based on the program 640.

For example, a program 640 to process acquired input image data may be stored in the memory 630. The memory 630 may, for example, comprise a recording medium recordable magnetically or optically and be able to record the acquired input image data, information acquired through a sensor 650, and image information. For example, the memory 630 may record a program 640 to control the image display apparatus 100 or various setting information. The input image data may be transformed based on the program 640 and display image data may be generated. Image information such as the input image data and display image data may be stored in the memory 630. The program 640 may be preliminarily stored in the memory 630. The program 640 may be provided through a memory medium such as CD-ROM (Compact Disc Read Only Memory) or network and installed in the memory 630.

The circuit 110 may include a sensor 650. The sensor 60 may be an arbitrary sensor such as a spectral radiance meter, a spectroradiometer, a camera, a microphone, a position sensor, or an acceleration sensor. For example, background luminance in front of the user may be measured. For example, an image to be displayed on the display 122 may be changed based on the information acquired by the sensor 650. Convenience and visibility of the image display apparatus may be improved.

An integrated circuit (IC) or IC chip set such as LSI (Large Scale Integration) may be used as a part or whole of each block in the circuit 110. Each block may be implemented by an individual circuit. A part or whole of each block may be implemented by an integrated circuit. Blocks may be implemented as a unit. A block or certain blocks may be separated from the other blocks. A part of a block may be separated from the other part of the block. A dedicated circuit or general processor may be used in the circuit 110, rather than LSI circuitry.

In the image display apparatus described above, processing of the circuit 110, the image processing unit 220, and luminance correction unit 230 may be performed by a processor such as CPU in a general-purpose computer executing a program. The program may be pre-installed in the computer. The program may be provided through a memory medium such as CD-ROM or network and installed in the computer.

In the disclosed embodiments, all or part of the processing may be performed by an OS (Operating System) operating in a computer based on a instruction from the program installed in a computer, or by an integrated system memory medium, a database management software, Middleware (MW) such as network, etc.

A memory medium is not limited to a medium independent from a computer or an integrated system; a memory medium memorized by downloading a program through LAN or internet may also be used. A plurality of memory media may be used for processing in these embodiments.

A computer or an integrated system may execute each disclosed process based on a program memorized in memory media. A computer or an integrated system may be implemented by an apparatus comprising a personal computer or microcomputer, or a system comprising a plurality of apparatus connected to a network. The computer may be implemented not only by a personal computer, but also by a image processing unit or microcomputer included in an information processing equipment. A computer is any device that is able to perform the functions described in these embodiments.

Each of the embodiments was described with specific examples. However, this disclosure is not limited to these specific examples. For example, one of ordinary skill in the art will understand that this disclosure may be implemented using available variations in the specific composition of each element like the background luminance input unit, the deblurring unit, the contrast conversion unit, the luminance correction unit, the light source, the display, the lens system, and the reflection unit.

One of ordinary skill in the art will also understand that this disclosure may be implemented using combinations of two or more elements from the specific examples.

While certain embodiments have been described, these embodiments have been presented by way of example only, and are not intended to limit the scope of the disclosure. Indeed, the embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

The invention claimed is:

1. An image processing device comprising:
   a background luminance input circuit configured to store background luminance information regarding background luminance;
   an image processing circuit configured to generate display image data and contrast conversion information, the display image data being provided by modulating a contrast of a correction image data so that pixel values included in the correction image data are in an acceptable range, the correction image data being provided by correcting blurring in an input image data to be input to the image processing circuit based on the background luminance information, the contrast conversion information being information used for the modulating, wherein the image processing circuit comprises:
      at least two filter image processing circuits configured to apply filters to be applied to the input image data, and transmit the correction image data; and
      one of the filters is a filter to decrease an energy function that expresses a difference between an image data that is generated by convolution of the correction image data with a space filter that expresses a deterioration process to cause blurring in an observation image and determined image data; and
   a luminance setting circuit configured to generate a luminance setting information to set a luminance of a projection unit based on the modulation information.

2. The device according to claim 1, wherein the image processing circuit further comprises:
   a filter selection circuit configured to transmit filter information to select one of the filter image processing circuits; and
   a filter switching circuit configured to switch the filter image processing circuits based on the filter information.

3. The device according to the claim 2, wherein the filter image processing circuit that has stronger correction effect is selected by the filter selection circuit.

4. The device according to the claim 1, wherein one of the filters is a filter to be applied in color space linear to luminance of the projection unit.

5. The device according to claim 1, wherein the contrast conversion information includes the maximum pixel value or the minimum pixel value in the correction image data.

6. The device according to claim 1, wherein the contrast conversion information includes information to indicate an amount of change of the maximum pixel value of the correction image data by the modulation.

7. The device according to claim 1, wherein the contrast conversion information includes information to indicate an amount of change of the minimum pixel value of the correction image data by the modulation.

8. The device according to claim 1, wherein the luminance setting information is generated based on a decrement of luminance due to the modulation of contrast of the correction image data.

9. The device according to claim 1, wherein the image processing circuit is configured to modulate contrast of the correction image data after deburring in the correction image data.

10. An image display apparatus comprising:

an image processing device comprising:
  a background luminance input circuit configured to store background luminance information regarding background luminance;
  an image processing circuit configured to generate display image data and contrast conversion information, the display image data being provided by modulating a contrast of a correction image data so that pixel values included in the correction image data are in an acceptable range, the correction image data being provided by correcting blurring in an input image data to be input to the image processing circuit based on the background luminance information, the contrast conversion information being information used for the modulating, wherein the image processing circuit comprises:
    at least two filter image processing circuits configured to apply filters to be applied to the input image data, and transmit the correction image data; and
    one of the filters is a filter to decrease an energy function that expresses a difference between an image data that is generated by convolution of the correction image data with a space filter that expresses a deterioration process to cause blurring in an observation image and determined image data; and
  a luminance setting circuit configured to generate a luminance setting information to set a luminance of a projection unit based on the modulation information;
the projection unit to emit light including image information based on a the display setting information; and
a reflection unit to reflect at least a part of light emitted by the projection unit toward eye and transmit a part of incident light.

11. The apparatus according to claim 10, wherein the projection unit comprises:
  a light source configured to emit light based on the luminance setting information; and
  a display to display an image based on the display image data.

12. The apparatus according to claim 10, further comprising a sensor to detect background luminance, wherein the sensor inputs the background luminance to the background luminance input circuit.

* * * * *